(12) United States Patent
Falter et al.

(10) Patent No.: US 8,403,114 B2
(45) Date of Patent: Mar. 26, 2013

(54) PNEUMATICALLY AND/OR ELECTROMECHANICALLY ACTUABLE COMMERCIAL VEHICLE DISC BRAKE

(75) Inventors: Wolfgang Falter, Heidelberg (DE); Christian Jungmann, Gorxheimertal (DE); Gunter Stingl, Muhltal (DE); Denny Moller, Heidelberg (DE)

(73) Assignee: Wabco Radbremsen GmbH, Mannheim (DE)

( * ) Notice: Subject to any disclaimer, the term of this patent is extended or adjusted under 35 U.S.C. 154(b) by 330 days.

(21) Appl. No.: 12/745,883

(22) PCT Filed: Nov. 24, 2008

(86) PCT No.: PCT/EP2008/009950
§ 371 (c)(1),
(2), (4) Date: Aug. 26, 2010

(87) PCT Pub. No.: WO2009/074222
PCT Pub. Date: Jun. 18, 2009

(65) Prior Publication Data
US 2010/0314205 A1    Dec. 16, 2010

(30) Foreign Application Priority Data
Dec. 12, 2007 (DE) .......................... 10 2007 059 777

(51) Int. Cl.
*F16D 55/02* (2006.01)
(52) U.S. Cl. ........................ 188/71.9; 188/71.7; 188/72.9
(58) Field of Classification Search ............... 188/71.9, 188/71.7, 196 D, 196 F, 369, 72.7–72.9
See application file for complete search history.

(56) References Cited

U.S. PATENT DOCUMENTS

| 5,568,845 A * | 10/1996 | Baumgartner et al. ...... 188/71.9 |
| 5,819,884 A * | 10/1998 | Giering ........................ 188/71.9 |
| 6,269,914 B1 | 8/2001 | Angerfors |
| 6,354,407 B1 | 3/2002 | Heinlein et al. |
| 6,668,981 B2 * | 12/2003 | Ortegren et al. ............. 188/72.2 |
| 6,923,297 B1 * | 8/2005 | Thomas et al. ............... 188/72.8 |
| 7,331,431 B2 * | 2/2008 | Fischer et al. ................ 188/71.9 |
| 7,374,026 B2 * | 5/2008 | Taylor et al. ................. 188/71.9 |
| 2009/0314589 A1 * | 12/2009 | Jungmann et al. ........... 188/71.9 |

FOREIGN PATENT DOCUMENTS

DE    43 34 914 A1    4/1995
EP    0 565 997 A    10/1993

* cited by examiner

*Primary Examiner* — Pamela Rodriguez
(74) *Attorney, Agent, or Firm* — Schwabe, Williamson & Wyatt, P.C.

(57) ABSTRACT

The invention relates to a pneumatically and/or electromechanically actuable commercial vehicle disc brake having a brake disc, a brake caliper, a brake application shaft which can be actuated by a pivoting lever and lies transversely with respect to a rotational axis of the brake disc, an adjusting device which is arranged at least partially within an inner space of the brake caliper, and a first sealing device for sealing an annular space which is delimited by the inner wall of a through opening of the brake caliper and a device which extends through the through opening. According to the invention, a holding device, which holds a second sealing device for sealing the annular space at least partially, and a third sealing device are provided, which sealing device bears against the holding device for sealing the annular space at least partially.

26 Claims, 4 Drawing Sheets

PNEUMATICALLY AND/OR ELECTROMECHANICALLY ACTUABLE COMMERCIAL VEHICLE DISC BRAKE

CROSS REFERENCE TO RELATED APPLICATIONS

The present application is a national phase entry of, and claims priority under 35 U.S.C. §120 to International Patent Application No. PCT/EP2008/009950, filed 24 Nov. 2008, entitled "PNEUMATICALLY AND/OR ELECTROMECHANICALLY ACTUABLE COMMERCIAL VEHICLE DISC BRAKE," which designates the United States of America and which claims priority to German Patent Application No. 10 2007 059 777.2, filed 12 Dec. 2007, entitled "PNEUMATICALLY AND/OR ELECTROMECHANICALLY ACTUABLE COMMERCIAL VEHICLE DISC BRAKE," the entire content and disclosure of which is hereby incorporated by reference in its entirety.

TECHNICAL FIELD

The invention relates to a pneumatically and/or electromechanically actuable commercial vehicle disc brake having
  a brake disc, a brake
  caliper,
  a brake application shaft which can be actuated by means of a pivoting lever and lies transversely with respect to a rotational axis of the brake disc,
  an adjusting device which is arranged at least partially within an inner space of the brake caliper, and
  a first sealing device for sealing an annular space which is delimited by the inner wall of a through opening of the brake caliper and a device which extends through the through opening.

BACKGROUND

Disc brakes of the above type are known, for example, from DE 103 56 801 B3. The first sealing device is formed by an elastic protective cap that has the form of a bellows-type sleeve that extends as a result of screwing out a pressure spindle of the adjusting device. In the known disc brake, it represents the only device for sealing the annular space and thus the interior of the brake caliper and the brake application and adjusting components it contains from external influences of any kind. The sealing device itself is exposed to the most varied external influences. These include mechanical influences such as gravel impact or inappropriate handling when servicing the brake. There are also thermal influences since the brake pad and brake disc are in the immediate vicinity. These influences can damage or even destroy the bellows-type sleeve. If the bellows-type sleeve is damaged and destroyed, however, all brake components will be exposed to environmental influences without protection so that the brake function may be impaired or even fail completely.

It is the problem of this invention to improve the disc brake according to DE 103 56 801 B3 in such a way that the brake interior and the components housed in it are effectively protected and that both the first installation of the brake and any later replacement of components are simple.

According to the invention, this problem is solved in a disc brake of the type described above by a holding device that holds a second sealing device for sealing the annular space at least partially. Furthermore, a third sealing device is provided that bears against the holding device for sealing the annular space at least partially.

Providing a second sealing device makes the entire sealing system redundant and thus more effective. The holding device that holds the second sealing device simplifies the first installation of the brake as well as the replacement of brake parts. The third sealing device further increases redundancy and thus the effectiveness of the sealing system. The holding device adds two functions: it holds the second sealing device and it interacts with the third sealing device to seal the annular space since the third sealing device bears against the holding device. Therefore the holding device is of special importance for the sealing system.

According to the invention, the through opening is a functional opening. In other words, at least one brake element that contributes to the functioning of the brake extends through the through opening. It can be the pressure collar of an adjusting nut and/or a pressure piston that may also be designed as a pressure spindle.

According to the invention, the device that extends through the through opening comprises a pressure collar and/or an adjusting spindle.

In a preferred embodiment of the invention, the holding device has a sleeve design. This results in particularly easy handling during first installation and part replacement.

The second sealing device preferably has a T-shaped cross section. The part that corresponds to the vertical bar of the "T" is preferably used for particularly reliable sealing of annular space while the transverse bar is used to fasten the sealing device within the brake.

According to the invention, the holding device also preferably couples the second sealing device in circumferential and/or axial direction of the brake with the device that extends through the through opening. It thus turns with the pressure collar, for example, when the brake is adjusted.

According to another preferred embodiment of the invention, the device that extends through the through opening and/or the adjusting device comprise(s) a male thread that cuts into the second sealing device at the transition from a first to a second operating state.

For example, the male thread will cut into the second sealing device on first contact, that is, at the transition from new to another operating state. This causes the sealing device to come to rest against the flanks of the male thread. The same effect occurs if a multi-start thread is used. This makes automated assembly processes simpler or makes them work at all.

According to the invention, the portion of the sealing device that engages in the male thread is designed and/or formed in such a way that it will not twist as a result of relative movement of the male thread.

Appropriate dimensioning (radial length) of the relevant part (vertical bar of the "T") will particularly contribute to this.

The holding device, the second sealing device, and at least one part of the device that extends through the through opening, especially the pressure collar, make up a prefabricated module according to yet another preferred embodiment of the invention. This simplifies first installation of the brake and part replacement.

It is further preferred that the module is prefabricated by compression molding. This also makes the manufacturing and/or replacement process easier.

According to the invention, it is further preferred to provide a grease reservoir that is delimited by the second sealing device. Other parts that can form the perimeter of the grease reservoir include a pressure block and/or a pressure spindle with a male thread. This can prevent friction coefficient variations for parts that glide on one another.

According to the invention, the third sealing device flatly rests against a portion of the inner wall of the through opening. This improves the reliability of the seal.

According to the invention, the third sealing device preferably comprises a portion protruding radially outwards beyond the inner wall of the through opening. This fastens it in axial direction of the brake.

The third sealing device of the invention is also preferably annular. This makes it fit to the annular space.

According to the invention, an inner diameter of the third sealing device is smaller in idle state than an outer diameter of the holding device.

in the assembled state, the third sealing device will therefore come to rest against the outer shell of the holding device, which increases the sealing effect.

According to the invention, the third sealing device preferably comprises a sealing lip stretching radially inwards. The main purpose of this sealing lip is to rest against the outer shell of the holding device for effective sealing of the annular space.

According to the invention, it is further preferred that the third sealing device is at least in some sections elastic. The elastic restoring force can be used for better sealing.

According to the invention, the third sealing device can comprise a reinforcement, especially in the form of an embedded metal ring. It is used in particular for protective and stabilizing purposes and thus also supports the holding and sealing function on the outer surface of the through opening.

It is preferred according to the invention that the second sealing device, the third sealing device, and/or the holding device have a rotationally symmetric design. This means that they do not have to be brought into a specific rotational position during assembly.

The surface area of the holding device against which the third sealing device rests has a smooth finish that promotes the sealing effect. In particular, the holding device is made of metal. It takes much less effort to give the holding device a particularly smooth surface than, for example, to give the pressure collar an according design. The smooth surface is particularly advantageous in embodiments in which the third sealing device is moved relative to the surface it interacts with during brake operation, i.e. the holding device.

In the disc brake according to the invention, the brake application shaft is advantageously supported by a pressure block on its brake application end.

Furthermore, the adjusting device advantageously comprises an adjusting nut and an adjusting spindle.

The through opening can be provided on the main body of the brake caliper or on the lid of the brake caliper.

It is preferred that the lid and the third sealing device form a prefabricated module. When it is installed, the third sealing device moves onto the holding device, which makes installation even simpler.

Finally, the invention preferably provides a pneumatically and/or electromechanically actuable commercial vehicle disc brake having a brake disc, a brake caliper, a brake application shaft which can be actuated by means of a pivoting lever and lies transversely with respect to a rotational axis of the brake disc, an adjusting device which is arranged at least partially within an inner space of the brake caliper, a first sealing device for sealing an annular space which is delimited by the inner wall of a through opening of the brake caliper and a device which extends through the through opening, a holding device that holds a second sealing device for sealing the annular space at least partially, and a third sealing device that bears against the holding device for sealing the annular space at least partially, characterized in that the device that extends through the through opening comprises a pressure collar of an adjusting nut and in that the holding device, the second sealing device, and the pressure collar form a prefabricated module.

BRIEF DESCRIPTION OF THE DRAWINGS

The invention will be explained in more detail using a preferred embodiment and with reference to the enclosed figures. Wherein.

DETAILED DESCRIPTION OF THE EMBODIMENTS

Figure 1:
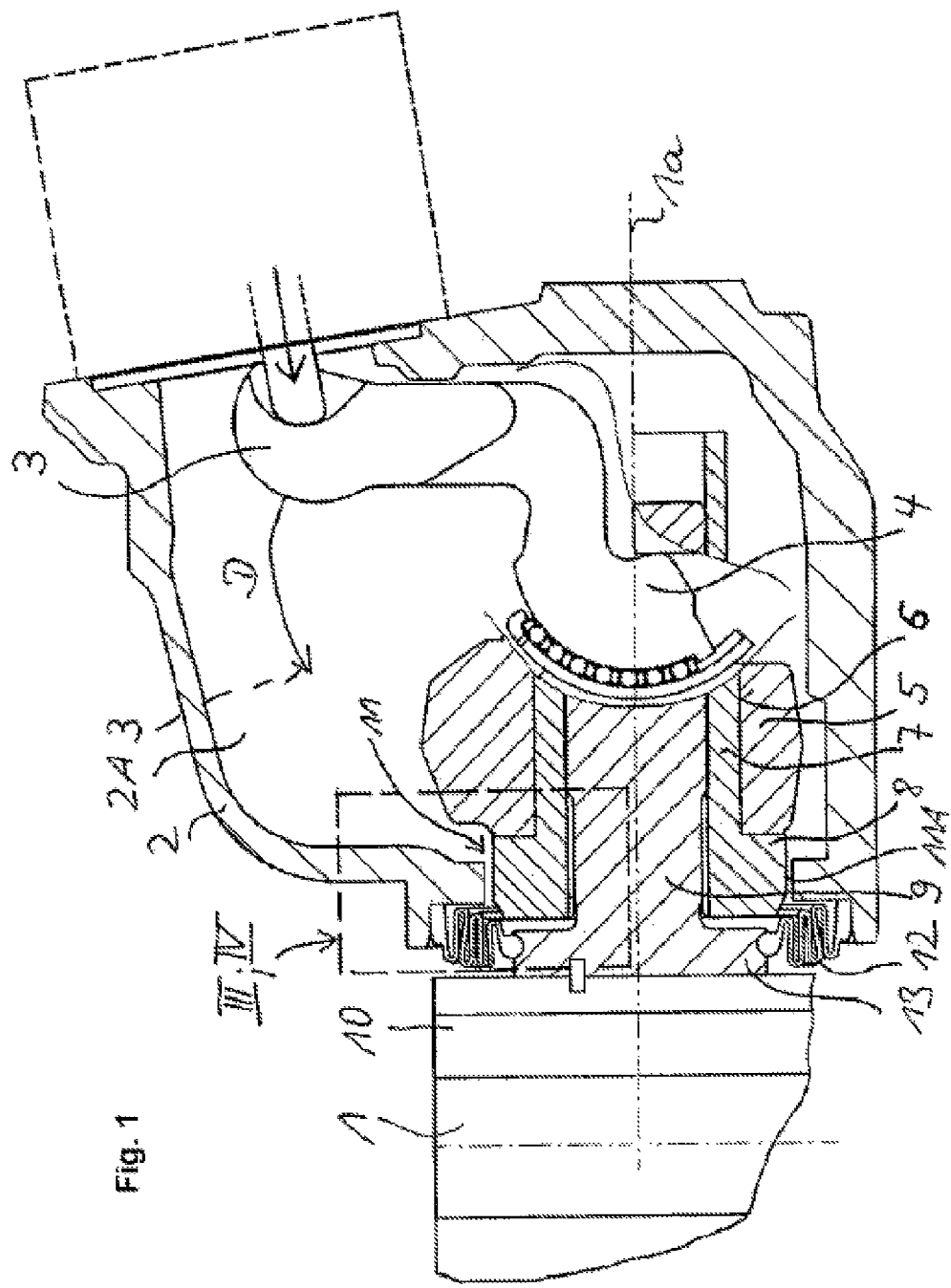
FIG. 1 shows a schematic sectional view of an embodiment of the disc brake according to the invention.
Figure 2:
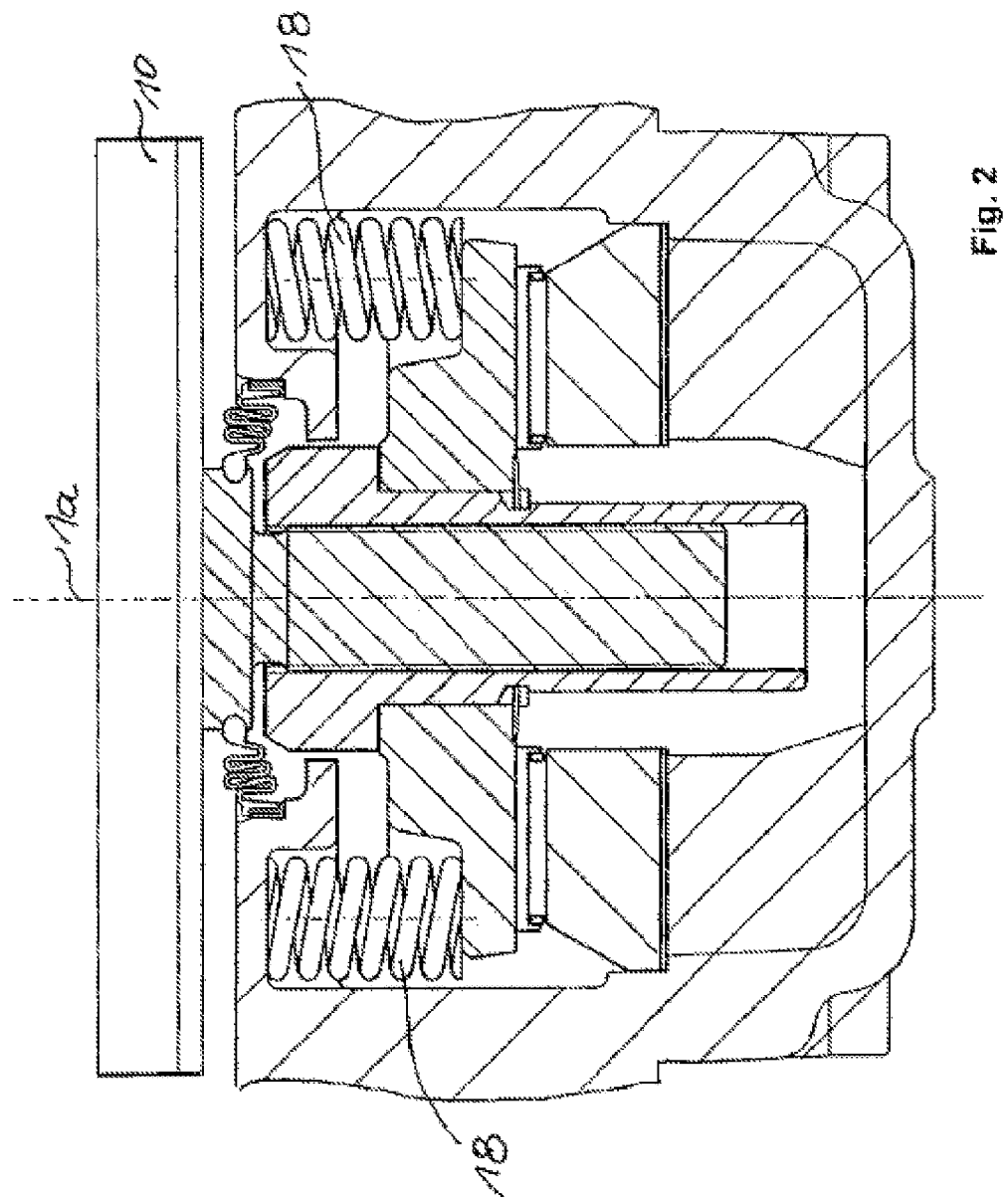
FIG. 2 shows another schematic sectional view of the embodiment according to FIG. 1.

The brake shown in the figure is a commercial vehicle brake having a brake caliper 2 that includes the brake disc 1 and supports a brake application shaft 4 which can be actuated by means of a pivoting lever 3 and lies transversely with respect to a rotational axis 1A of the brake disc 1. The brake application shaft 4 interacts with a splined pressure block 5 that extends transversely with respect to the brake disc 1. The pressure block 5 comprises a through opening 6 which houses, as part of the adjusting device, a rotatable adjusting nut 7 having a pressure collar 8 facing the brake disc 1. A pressure spindle 9 with a male thread 9A is screwed into said adjusting nut 7 and cannot pivot about the rotational axis 1A. When the brake is actuated, it presses against a brake pad 10 on the brake application side. The brake application lever 3, the brake application shaft 4, the pressure block 5, the adjusting nut 7, and the pressure spindle 9 are (at least partially) housed in an inner space 2A of the brake caliper 2. The brake caliper 2 comprises a functional opening facing towards the brake disc 1 into or through which the pressure collar 8 of the adjusting nut 7 and the pressure spindle 9 extend. An annular space 11A is located between the inner wall of the through opening 11 of the caliper 2 and the pressure collar 8 of the adjusting nut or the pressure spindle 9, respectively. An elastic protective cap in the form of a bellows-type sleeve 12 is used for sealing this annular space. It is on one end attached to the brake caliper 2 or, according to FIGS. 3 and 4, to a lid 2.1 that can be attached to the brake caliper, and on the other end to the portion 13 of the pressure spindle 9 that faces the brake disc 1. The pressure block 5 rests on the brake application side of the pressure collar.

The section of the pressure collar 8 of the adjusting nut 7 that extends into the functional opening 11 is used for form-fitting fastening of a sleeve body 14 that encompasses the axial and radial pressure collar sections; said sleeve body is used as a sealing surface against a seal 15 that seals the inner space 2A and at the same time for holding a seal 16 that protects the male thread 9A of the pressure spindle 9. The seal 15 is located in the radially outer part of the annular space 11A, the seal 16 in its radially inner part.

In other words, the pressure collar 8 with the sealing and fastening sleeve in form of the sleeve body 14 attached to it is of special importance for the design and arrangement of the redundant sealing system according to the invention.

The seal 15 is made of an elastic material. It is configured in such a way that it encompasses and seals the functional opening 11 across its entire surface and on both sides when installed. On the side facing the brake pad 10, a metal ring 15.1 embedded in the seal material is provided that has the shape of an "L" in the embodiment shown. It has a protective and stabilizing function. In addition, it makes installation simpler, especially automated installation. A torus 152 that protrudes in radial direction beyond the functional opening 11 is provided on the side facing the inner space 2A. This holds the seal 15 reliably on the functional opening 11.

The seal 15 has an elastic annular space lip 15.3 in radial inward direction. Its inner diameter is smaller than the outer diameter of the sleeve body 14. In other words, the radial extension of the annular space lip 15.3 is so dimensioned that it completely surrounds the sleeve body 14. In assembled condition, it rests with its entire area against the outer shell of the sleeve body 14. Due to its elasticity, this stationary annular space seal can compensate axial, radial, and rotational movements performed by the pressure collar 8 of the adjusting nut 7 with the sleeve body 14 during braking and brake adjustment without losing sealing capacity.

The shell surface of the holding sleeve that is preferably made of metal and against which the annular space lip 15.3 sits tightly in assembled condition is very smooth. The smooth finish of this shell surface can be achieved much easier than for other brake elements such as the pressure collar 8. The holding sleeve 14 provides an optimum sealing surface and reliable multiple protection of the inner space 2A of the disc brake in interaction with the elastic (annular space) seal 15. It is also used for holding the seal 16 in the embodiment of the invention shown in the figure. It is thus multifunctional.

The elastic seal 16 is provided for effective protection of the male thread 9A and the spindle drive formed by the adjusting nut 7 and the pressure spindle 9. It is fastened in axial and radial position by the sleeve body 14 on the front end of the pressure collar 8 that faces the brake pad 10. It turns with the adjusting nut 7. This is why it has a T-shaped cross section. This results in bulge sections 16.1, 16.2 that provide an all-round seal on both sides of the outer shell in the direction of the pressure collar 8 and the sleeve body 14.

The sealing area/Hp 16.3 that has a very slim design and extends in the direction of the male thread 9A of the non-pivoting pressure spindle 9. This section of the seal 16 is made of such material and dimensioned in such a way that the male thread 9A cuts into it on first contact with the start of the thread. In this way, the inner sealing surface of the seal 16 automatically comes to rest against the thread flanks. This produces optimum thread sealing even in radial direction, which is highly effective for multi-start threads. This design is particularly advantageous with respect to automated assembly. Another advantage results from the comparatively large contact area of the section of the sleeve body 14 that is used as a holder and the sealing surface/lip 16.3 in the direction of the thread. This makes this section comparatively large in area, which is why it will not twist if there are movements relative to the male thread 9A.

The seal 16 is compression molded with the holding sleeve 14 and the pressure collar 8 as a prefabricated module that will then be completed with the remaining components. This makes the installation process considerably simpler.

Since the seals 15 and 16 do not or just slightly change their installation positions and are approximately on top of one another in radial direction, the very narrow installation spaces in the brake are utilized to an optimum extent. Said sealing and bearing/holding components are rotationally symmetrical. This means that no special embodiments have to be brought into a specific installation position.

The axial installation length of the sleeve body 14 is so dimensioned that there is no risk of crushing the seal 16 when the seal 16 is inserted first and then compression molded onto the pressure collar 8. This is ensured by its closed length with respect to the end of the pressure collar when the module is assembled. A grease reservoir 17 is formed by the male thread 9A, the pressure collar 8, and the seal 16. This is to prevent variations of the friction coefficient if the said elements move relative to one another.

The functional opening 11 is placed on the main body of the brake caliper 2 in the embodiment shown. It can also be provided on a lid of the brake caliper 2.

The brake shown in the figure is actuated by swiveling the pivoting lever 3 if a braking process is initiated, for example, via an actuating device flanged onto the brake caliper 2. Movement towards the brake pad 10 occurs involving the pressure block 5 that supports at least one adjusting nut/pressure spindle arrangement. When the brake is released, a (pressure) spring system 18 moves the entire brake application device back to its initial position. Thus the annular space lip 15.3 will slide across the outside area of the sleeve body 14 when there are purely axial movements. If required adjustment movements occur via the adjusting device not shown here (see FIG. 4), the adjusting nut 7 rotates and the pressure spindle 9 is screwed out. The male thread 9A turns with respect to the seal 16 held on the adjusting nut 7 or the pressure collar 8, respectively, or relative to the sealing surface/lip 16.3 resting against the flanks of the thread, respectively. Even if the bellows-type sleeve 12 were damaged, the multiple seals effectively protect the inner space 2A of the brake caliper 2 and in particular the spindle drive. The bellows-type sleeve 12 can than be replaced in the conventional way during a later brake service. This applies similarly to the seal 15, if required. As can especially be seen in FIG. 4, the seals 15 and 16 do not change their positions although the pressure spindle 9 is screwed out of the adjusting nut 7 due to adjusting movements.

Figure 3:
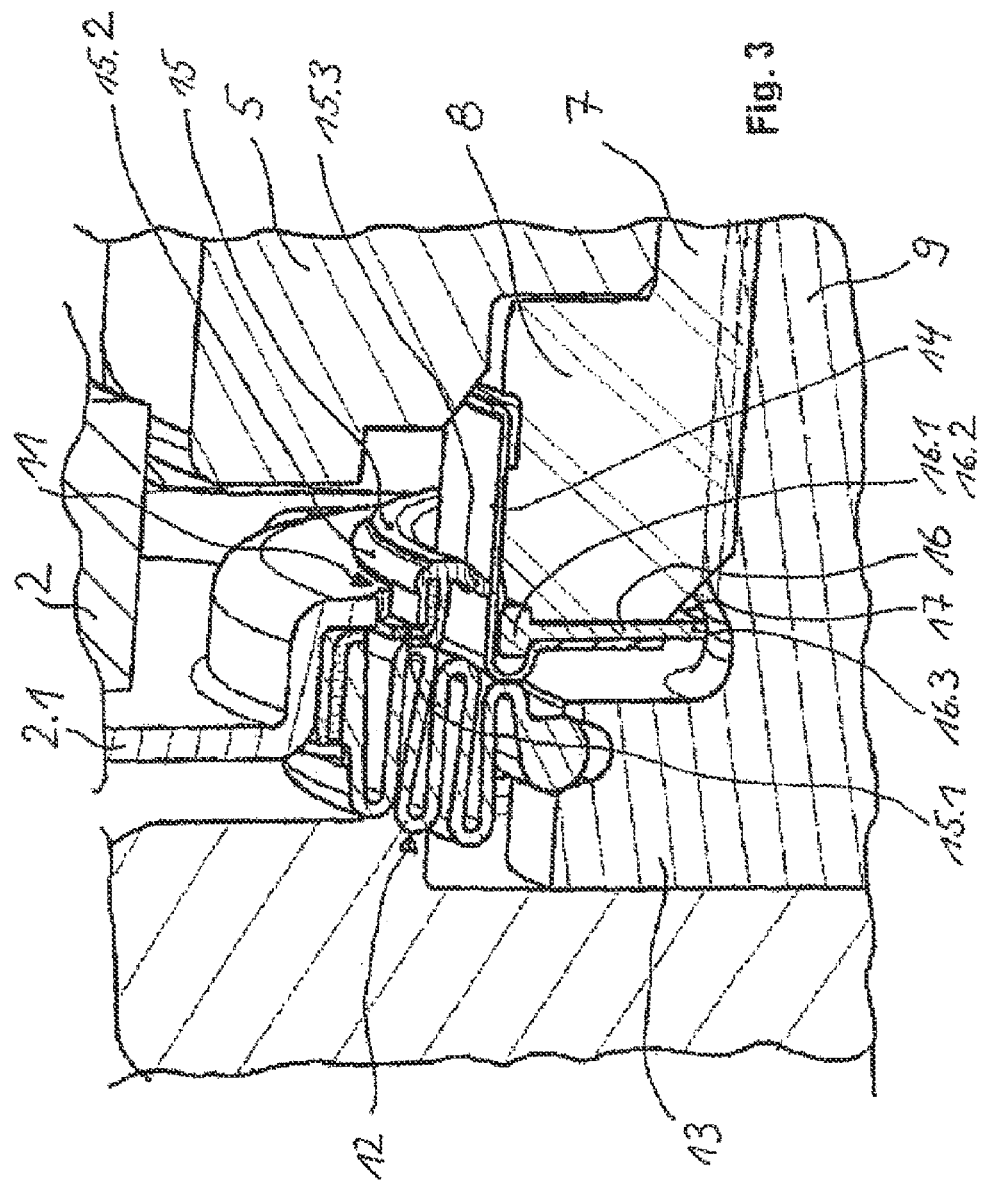
FIG. 3 shows a schematic partial sectional perspective view of a part of the embodiment according to FIG. 1 in its initial position.
Figure 4:
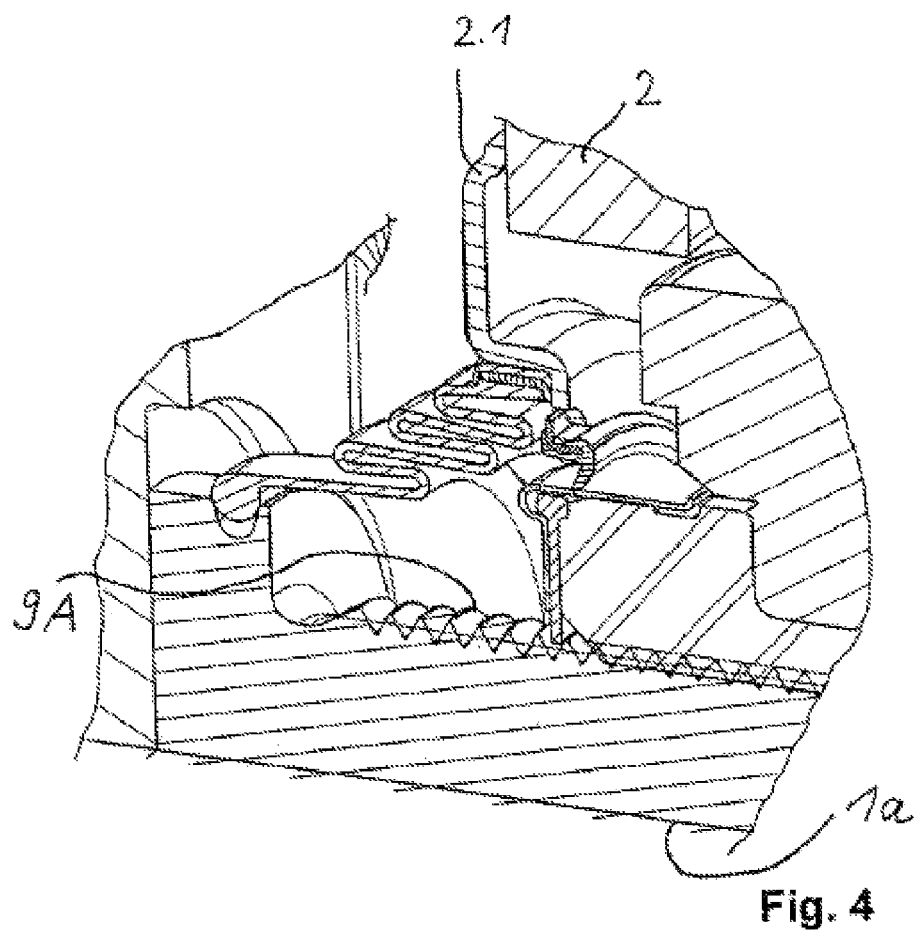
FIG. 4 shows another schematic partial sectional perspective view of a part of the embodiment according to FIG. 1 with a partly screwed out pressure spindle.

As can be seen from FIGS. 3 and 4, the caliper 2 is dosed with a lid 2.1 on the side of the brake disc. Even if this cannot be seen in the figure, the lid 2.1 can for example be screwed onto the main body of the caliper 2. The lid 2.1 for simpler installation with the third sealing device 15 before it is fastened to the caliper 2, e.g. by means of a screwed connection. When the lid 2.1 is screwed or fastened to the caliper 2, the "tilted" third sealing device 15 moves onto the holding device 14. The sealing function is particularly effective if the sealing device 15 is or remains (permanently) "tilted" facing outwards in all operating states of the brake.

Although the embodiment shown in the figures is a single-spindle brake, the invention can also be applied to two- or multi-spindle brakes because these brakes also comprise functional openings towards a brake pad or brake disc through which functional elements extend.

The characteristics disclosed in the above description, the claims and the figures can be relevant both individually and in combination for implementing the various embodiments of the invention.

The invention claimed is:
1. A pneumatically and/or electromechanically actuable commercial vehicle disc brake having
 a brake disc,
 a brake caliper, a brake application shaft which can be actuated by means of a pivoting lever and lies transversely with respect to a rotational axis of the brake disc, an adjusting device which is arranged at least partially within an inner space of the brake caliper, and a first sealing device for sealing an annular space which is delimited by the inner wall of a through opening of the brake caliper and a device which extends through the through opening, the device that extends through the through opening comprising a pressure collar of an adjusting nut performing rotational movements during brake adjustment, a holding device that holds a second sealing device for at least partially sealing the annular space and couples the second sealing device in circumferential direction, and a third sealing device that bears against the holding device for at least partially sealing the annular space.

2. The brake according to claim 1, characterized in that the through opening is a functional opening.

3. The brake according to claim 1, characterized in that the device that extends through the through opening comprises an adjusting spindle.

4. The brake according to claim 1, characterized in that the holding device has a sleeve design.

5. The brake according to claim 1, characterized in that the second sealing device has a T-shaped cross section.

6. The brake according to claim 1, characterized in that the holding device couples the second sealing device in axial direction of the brake with the device that extends through the through opening.

7. The brake according to claim 1, characterized in that the device that extends through the through opening and/or the adjusting device comprise(s) a male thread that cuts into the second sealing device at the transition from a first to a second operating state.

8. The brake according to claim 7, characterized in that a portion of the second sealing device into which the male thread cuts is designed and/or formed in such a way that it will not twist as a result of relative movement with respect to the male thread.

9. The brake according to claim 1, characterized in that the holding device, the second sealing device and at least a portion of the pressure collar extending through the through opening form a prefabricated module.

10. The brake according to claim 9, characterized in that the module is prefabricated by compression molding.

11. The brake according to claim 1, characterized in that it comprises a grease reservoir delimited by the second sealing device.

12. The brake according to claim 1, characterized in that the third sealing device flatly rests against a portion of the inner wall of the through opening.

13. The brake according to claim 1, characterized in that the third sealing device comprises a portion protruding radially outwards beyond the inner wall of the through opening.

14. The brake according to claim 1, characterized in that the third sealing device is annular.

15. The brake according to claim 1, characterized in that an inner diameter of the third sealing device is smaller in idle state than an outer diameter of the holding device.

16. The brake according to claim 1, characterized in that the third sealing device comprises a sealing lip extending radially inwards.

17. The brake according to claim 1, characterized in that the third sealing device is at least in some sections elastic.

18. The brake according to claim 1, characterized in that the third sealing device comprises a reinforcement.

19. The brake according to claim 1, characterized in that the second sealing device, the third sealing device and/or the holding device is/are rotationally symmetrical.

20. The brake according to claim 1, characterized in that a surface portion of the holding device against which the third sealing device rests has a smooth finish that enhances a tight seal.

21. The brake according to claim 1, characterized in that the brake application shaft rests on a pressure block on its brake application end.

22. The brake according to claim 1, characterized in that the adjusting device comprises an adjusting nut and an adjusting spindle.

23. The brake according to claim 1, characterized in that the through opening is provided on a lid of the brake caliper.

24. The brake according to claim 23, characterized in that the lid forms a prefabricated module with the third sealing device.

25. A pneumatically and/or electromechanically actuable commercial vehicle disc brake having a brake disc, a brake caliper, a brake application shaft which can be actuated by means of pivoting lever and lies transversely with respect to a rotational axis of the brake disc, an adjusting device which is arranged at least partially within an inner space of the brake caliper, a first sealing device for sealing an annular space which is delimited by the inner wall of a through opening of the brake caliper and a device which extends through the through opening, the device that extends through the through opening comprising a pressure collar of an adjusting nut performing rotational movements during brake adjustment, a holding device that holds a second sealing device for at least partially sealing the annular space and couples the second sealing device in circumferential direction, and a third sealing device stationarily held on said through opening and bearing against the holding device for at least partially sealing the annular space.

26. The brake according to claim 25, wherein the holding device, the second sealing device, and the pressure collar form a prefabricated module.

* * * * *